P. C. SCHAANNING.
MACHINE FOR PEELING THE BARK FROM SHORT LOGS INTENDED FOR THE MANUFACTURE OF WOOD PULP AND THE LIKE.
APPLICATION FILED JUNE 3, 1915.

1,254,362.

Patented Jan. 22, 1918.

Inventor:
P. C. Schaanning
by M. Wallace White
Attorney

UNITED STATES PATENT OFFICE.

PEDER CHRISTIAN SCHAANNING, OF VINDEREN, PR. CHRISTIANIA, NORWAY, ASSIGNOR, BY DIRECT AND MESNE ASSIGNMENTS, TO J. & A. JENSEN OG DAHL, OF CHRISTIANIA, NORWAY, A PARTNERSHIP CONSISTING OF HARALD JENSEN AND KNUD DAHL.

MACHINE FOR PEELING THE BARK FROM SHORT LOGS INTENDED FOR THE MANUFACTURE OF WOOD-PULP AND THE LIKE.

1,254,362.

Specification of Letters Patent. Patented Jan. 22, 1918.

Application filed June 3, 1915. Serial No. 31,845.

*To all whom it may concern:*

Be it known that I, PEDER CHRISTIAN SCHAANNING, subject of Norway, residing at Vinderen, pr. Christiania, Norway, have invented new and useful Improvements in Machines for Peeling the Bark from Short Logs Intended for the Manufacture of Wood-Pulp and the like, of which the following is a specification.

In the wet-peeling of bark from short-logs intended for the manufacture of wood pulp essentially two different systems of peeling machines have been used hitherto. In one system a large iron plate drum with hollow trunnions is used, through which circulates constantly water, which passes the short-logs within the drum, the logs rushing and rubbing incessantly upon each other. After the lapse of a certain time the peeling is completed, the drum is emptied and again filled. The drawback of this machine is partly that the operation is not continuous and partly that the logs are worked up in their ends, so that they get the resemblance of a paint-brush.

In the other system a long horizontal drum of angle iron is used which is open at both ends and mounted in a basin partly filled with water. The drum rests upon rolls and is rotated by means of a gearing. The rolls, however, operate submerged in water, and on account hereof it is practically impossible to get them rotated, the more because bark waste accumulates around them. The rolls therefore stop after a short time and are then worn at the contacting point with the drum, until concave surfaces have been formed which still more prevent a continued good operation. The machine then must be subjected to repairs.

Figure 1:
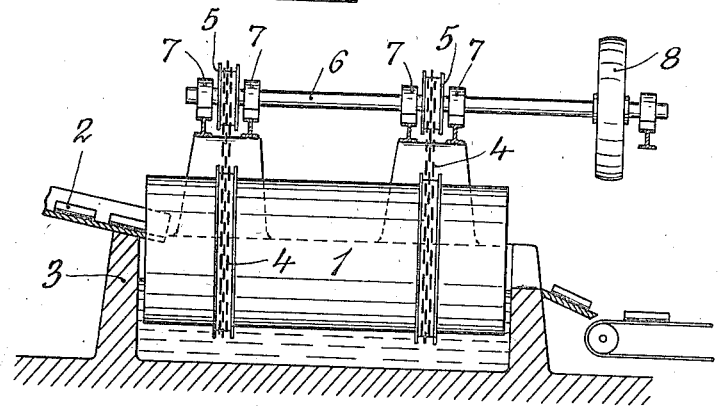
Figure 2:
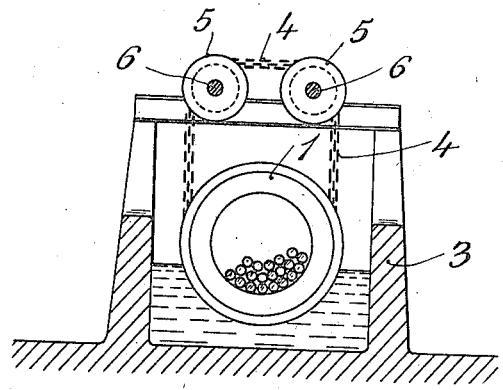

The present invention consists in an arrangement, by means of which the mentioned drawbacks in machines of the last-named system are prevented. The invention is illustrated in the accompanying drawing, in which:

Figure 1 is a side elevation, partly in section, and Fig. 2 is a cross section of the machine. The drum is shown diagrammatically.

As shown in the drawing the usual bark peeling drum —1— receives the short-logs —2— at one end and delivers the peeled logs continuously from the other end. This drum is not, as hitherto arranged in the basin —3— so as to rest upon submerged rolls, but it is suspended in the lower bight of wires or chains —4— passing over rolls —5— arranged in the open air at a suitable height above the drum. These rolls are mounted on shafts —6— which consequently rest in bearings —7— above the water so that they can be lubricated and inspected just as any other bearing. The rolls —5— in such case can simultaneously transfer the rotation to the drum through the chains the shafts being driven by pulleys —8— or the like. Thereby the whole machinery is simplified, and at the same time its safe driving cannot more be subjected to the influence of bark waste, water, rust or the like. The machine also requires only a small driving power. Besides the cleaning of the basin from bark waste can take place during the operation of the machine, because its bottom now contains no bearings, rolls or other machine elements.

Having now described my invention, what I claim as new and desire to secure by Letters Patent is:

1. In log barking machines, a water tank, a substantially cylindrical perforated barking drum in said water tank, annular guiding devices on said barking drum, a supporting frame, substantially parallel laterally separated suspending drive shafts mounted on said frame, alined drive rolls mounted on said shafts to coöperate with said guiding devices on said barking drum, and endless chain suspending members engaging said suspending guide rolls and said guiding devices to suspend and rotate said barking drum within said tank while allowing slight lateral movement and vibration of said drums, the opposite depending runs of said suspending members being at least substantially as far separated adjacent said guide rolls as adjacent said guiding devices.

2. In log barking machines, a water tank, a substantially cylindrical open ended perforated barking drum in said water tank, grooved tires on said barking drum, a supporting frame mounted on the sides of said water tank, parallel suspending drive shafts mounted on said frame, alined grooved drive rolls mounted on said shafts so that their outside peripheral faces are substantially vertically above the lateral portions of the grooved tires of said barking drum, endless flexible suspending members engaging said suspending guide rolls and said grooved tires to suspend and rotate said barking drum within said tank.

In testimony whereof I have signed my name to this specification in the presence of two subscribing witnesses.

PEDER CHRISTIAN SCHAANNING.

Witnesses:
AXER LAHN,
MAGERO BUGGE.